J. T. HALSEY.

Railway Signal.

No. 9,563. Reissued Feb. 15, 1881.

Attests

John Dolley Jr.

John K. Rupertus.

Inventor

James T. Halsey,

By his Attorneys,

W. C. Strawbridge,

J. Bonsall Taylor.

N. PETERS, PHOTO-LITHOGRAPHER, WASHINGTON, D. C.

UNITED STATES PATENT OFFICE.

JAMES T. HALSEY, OF ALTOONA, PENNSYLVANIA.

RAILWAY-SIGNAL.

SPECIFICATION forming part of Reissued Letters Patent No. 9,563, dated February 15, 1881.

Original No. 205,858, dated July 9, 1878. Application for reissue filed March 19, 1880.

*To all whom it may concern:*

Be it known that I, JAMES T. HALSEY, of Altoona, in the county of Blair and State of Pennsylvania, have invented certain new and useful Improvements in Railroad-Signals; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to railroad-signals which are designed to show the condition of the track to an approaching train at such a distance from a given point (such as a switch or crossing) as to allow of sufficient time to stop the momentum of the train before it reaches such point in case of danger, or to indicate that all is safe, so that the train may pass on without diminution of speed.

I am aware that a number of signaling apparatus have been devised with a view to accomplish this desired result, and that such devices have been operated by means of wire rope, gravity, &c.; but heretofore signals so operated have proved defective and unreliable for several causes, to wit: The expansion and contraction of the metal of which the rope is composed, caused by variations of temperature, have proved a fruitful cause of trouble in the practical operation of such devices. Again, should the rope or any part of the signaling apparatus become broken from any cause, it may fail to show the desired signal at a critical time, and thereby fail of its object. The same danger might occur through the freezing up of the rope in the box in which it is held, or by the breaking of the spring-counterpoise by which the rope is kept at the proper degree of tension—all or either of which causes are sufficient to render the apparatus inoperative, and consequently worse than useless as an indicator of danger to the approaching train. By the use of my improvements such railroad-signals are rendered perfectly safe and reliable, said improvements being specially contrived to overcome the above-mentioned objections to the use of such devices.

My invention consists in a semaphore-arm and a compensating device for operating the same, as more specifically described and claimed hereinafter.

Figure 1:
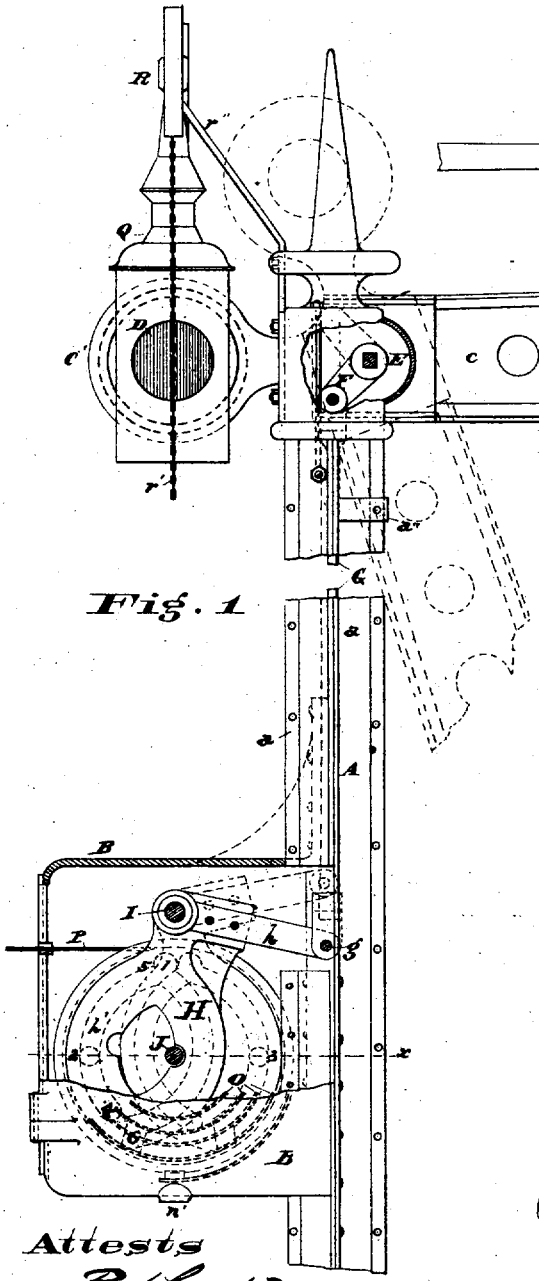
Figure 4:
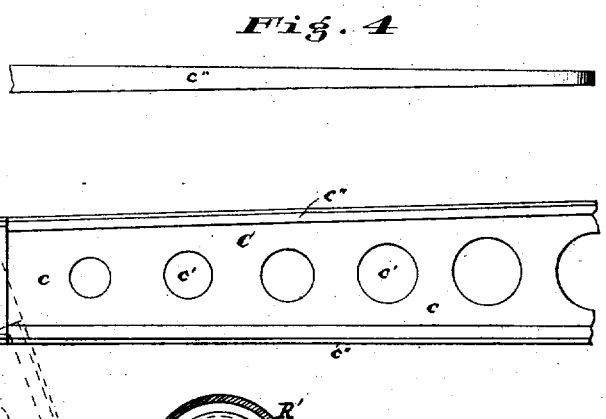
Figure 3:
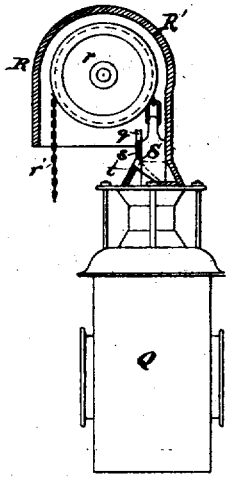
Figure 2:
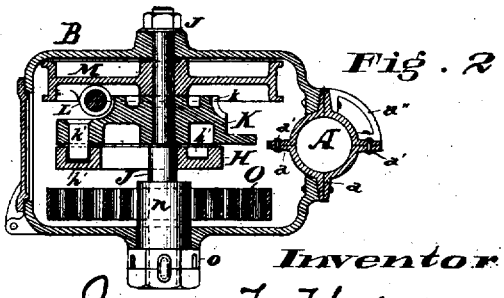

In the accompanying drawings, Figure 1 is an elevation of my improved signaling apparatus, shown partly in section. Fig. 2 is a horizontal section taken on the line *x x*, Fig. 1. Fig. 3 is a detached view of the lantern and its hoisting apparatus, the latter shown in section. Fig. 4 is a top or plan view of the semaphore; and Fig. 5 is a vertical section of the same, showing the method of construction.

Referring to the parts by letters, A represents the post or pillar which supports the signaling apparatus. It is made of iron, in the form of a hollow column, with flanges *a* projecting from its outer periphery. As shown by Fig. 2, it is preferably made of four vertical sections, united together by bolts or rivets *a'*, passed through the flanged portion *a*. At suitable distances apart metal rounds or steps *a''* are bolted or secured to the flanges *a*, and constitute a ladder, by means of which the workmen may conveniently climb to the top of the column when necessary.

B is a box, which is secured to the column at its base or at any convenient point. This box contains the mechanism for operating the signal, the construction and operation of which will be hereinafter described.

Figure 5:
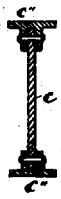

C is the semaphore, constructed of a central web or plate of metal, *c*, which may be made solid or perforated with a series of air-holes, *c'*, and flanged edge plates, *c''*, which are bolted or riveted to the web *c*, as clearly shown by Fig. 5 of said drawings. Said flanges *c''* are also made tapering in form, as shown by Fig. 4 of the drawings, so as to afford less resistance to the wind at the outer extremity of the semaphore.

C' is a circular extension secured to the inner end of the semaphore, and which is formed or provided with an opening, D, glazed with red glass or other red-colored transparent medium.

The semaphore is pivoted to the post A by a pivot bolt or pin, E, to which there is keyed a crank-arm, F. The other end of this crank-arm is pivoted to a rod, G, which passes down through the interior of the column or post A, and connects with the arm *h* of the compensating device H by a pivot-bolt, *g*.

The compensating device is pivoted to a shaft or pin, I, secured to the sides of the box B. This compensating device H is somewhat elliptical in form, and is formed with a channel or groove, *h'*, and a central opening through it, with recesses on each side of its center for the passage of a shaft, J, on which the rope-drum is mounted.

K is a crank-wheel, having a worm-gear, *k*, on its outer periphery, which meshes with a screw, L, which is secured to and supported by a rope-drum, M. It is also provided with a pin, K', which works in the groove *h'*, formed in the compensating device. The rope-drum and crank-wheel are mounted on the shaft J, which is journaled in proper bearings in the sides of the box B. The object of connecting the rope-drum and crank-wheel together, as described, is to insure the adjustment of the rope to the proper length for operating the signal device, and yet have a surplus of rope on the drum in case it should break and require splicing.

O represents a coiled spring, the inner end of which is keyed to the arbor *n*, which arbor is keyed to the shaft J, and the other ends bolted to the base of the box B at *n'*, as shown in Fig. 1 of the drawings. *o* is a key, by means of which the spring is adjusted.

P is the wire rope, which is coiled around the drum M and passes out through the box B to the office of the operator.

Q represents the signal-lantern, and R the apparatus for hoisting the same, consisting of a casing, R', within which a pulley, *r*, is journaled. Over this pulley a hoisting-chain, *r'*, is passed, the end of which is attached, by means of a link, to a stem, S, secured to the top of the lantern. This stem is formed with a projecting key, *s*, which fits into a recess, *q*, formed in the casing R' for its reception, and into which it is guided by means of inclined guides *t t*, formed on the lower portion of the casing R'. This hoisting apparatus R is secured to the top of the post A by means of an arm, *r''*, as clearly shown by Fig. 1 of the drawings, in such position that when the lantern is hoisted its lights are in a line with the circular end of the semaphore when the latter is in horizontal or "danger" position, the red glass D being thereby interposed between the light and the approaching train.

When the semaphore is in the "safety" position, as shown by dotted lines, Fig. 1, its circular end, having the red glass, is moved away from the lantern, so that the latter will show the white or "safety" light. Thus it will be seen that after the lantern is hoisted it does not require to be again moved or turned in signaling, and it is held securely in position by means of the key *s* and recess *q*.

The operation of the apparatus for moving the semaphore is as follows: When in the position indicated by full lines in Fig. 1 of the drawings it indicates "danger," or that the switch is wrong or not in proper position for the approaching train. It has been brought to this position by pulling on the rope P, and thereby causing the drum M and crank-wheel K to turn on the shaft J. The pin on the crank-wheel causes the compensating device H to oscillate, and thereby, through connection of its arm *h* with the rod G and crank F, raises the semaphore to the horizontal or "danger" position. When the switch is right the rope P is slack, and the spring, being keyed to the shaft N, as described, tends to take up this slack, and at the same time rotates the stud or pin K' to the right of the groove *h'*, said groove being coincident with the path of the pin's motion. There is no motion given to the compensator until it reaches the point 1. Then the compensator will be moved to the position shown by dotted lines, at the same time raising its arm and the rod G, and thereby lowering the semaphore. There is sufficient travel given to the rope to allow the stud or pin to move through an arc of one hundred and eighty degrees, as represented by 2 3, Fig. 1; but a space of thirty degrees is only necessary to operate the semaphore, and as there is no movement of the compensator during the time the pin travels between the points 4 5, this gives all necessary allowance for the expansion and contraction of the rope. Now, suppose the stud or pin K' to be in the position 2, and that the rope should break, the tendency would then be for the spring to move stud K' to the right, passing the point 1 and moving the compensator to the other side, throwing the semaphore down. The pin, continuing its movement, however, passes on until it reaches the vertical portion of the groove at 6, thereby forcing the compensator back to its first position and raising the semaphore to "danger." Again, suppose that the spring should break with the pin K' in position 3 and the semaphore down, in order to raise the semaphore the rope must be pulled. In so doing the pin rotates to the left, and when passing the point 1 moves the compensator over, thereby moving the semaphore to "danger," in which position it will remain, because when the rope is again slackened (the spring being broken) there is no force to move the compensator to the other side and thereby throw down the semaphore.

Thus it will be seen that the operation of the device is not affected by the expansion or contraction of the rope. Should the rope break with the semaphore at "safety," the spring, relieved of the restraint of the rope, will instantly recoil and move the semaphore to "danger," while should the rope break with the semaphore at "danger," the spring will first throw the semaphore down, and then cause its instant return to the "danger" position. On the other hand, should the spring break with the semaphore at "safety," (a contingency almost too remote to occur,) the next movement of the rope will place the semaphore at "danger," in which position, in the absence of any force to move it from such position, it will remain, while should the spring break with the semaphore at "danger," it will for a similar reason likewise remain in such position.

Having thus described my invention, what I claim as new, and desire to secure by Letters Patent, is—

1. A counterpoise-spring, O, connected with the rope-drum and with the device through the medium of which the drum operates the compensator, in combination with the compensator and semaphore, the arrangement being such that should the drum-rope break, the counterpoise-spring will cause the semaphore to indicate "danger," whatever may have been the position of the semaphore at the time of the breaking of the rope.

2. The combination, substantially as herein described, of the rope P, the rope-drum M, and the device through the medium of which the drum operates the compensator, with the compensator and semaphore, and with the counterpoise-spring, in such manner that should the spring break with the semaphore in the "danger" position, the semaphore will remain in such position, while should the spring break with the semaphore at "safety," upon the next movement of the rope the semaphore will be placed and remain in the "danger" position, so that in neither case can a further movement of the rope move said semaphore from said "danger" position.

3. The counterpoise-spring O, arranged to operate in combination with the compensator H and semaphore C, substantially as and for the purpose specified.

4. The rope-drum M and crank-wheel K, arranged to operate in combination with the compensator H and with the operating-rope and semaphore C, substantially as and for the purpose specified.

5. The compensator H, spring O, crank-wheel K, rope-drum M, and semaphore C, all operating in combination substantially as and for the purpose specified.

In testimony that I claim the foregoing as my own I affix my signature in presence of two witnesses.

Philadelphia, July 10, 1879.

JAMES T. HALSEY.

Witnesses:

J. BONSALL TAYLOR,

W. C. STRAWBRIDGE.